UNITED STATES PATENT OFFICE.

CHARLES G. RICHARDSON, OF NEW YORK, N. Y.

MANTLE FOR INCANDESCENT LIGHTING.

SPECIFICATION forming part of Letters Patent No. 671,001, dated April 2, 1901.

Application filed August 19, 1899. Serial No. 727,796. (No model.)

*To all whom it may concern:*

Be it known that I, CHARLES G. RICHARDSON, a subject of the Queen of Great Britain and Ireland, residing at the city of New York, borough of Manhattan, State of New York, have invented certain new and useful Improvements in the Art of Incandescent Gas-Lighting, of which the following is a specification.

This invention relates to improvements in the art of incandescent gas-lighting, and especially to improvements in mantles for incandescent gas-lighting and the manufacture thereof.

The object of the invention is to produce durable mantles of high illuminating power at a single simple operation by a process of molding as a substitute for the present process of producing mantles of the so-called "Welsbach" type by first saturating combustible fabric with suitable mineral solutions, then shaping, then burning out, and finally coating the burned-out skeleton with some protective material, which again requires to be burned off before the mantle is ready for use for illumination.

Concisely stated, my process aims to produce a mantle by the single operation of molding either a pliable mass or a liquid consisting of suitable incandescible material and a binding agent into the shape of the finished mantle, ready for use as it comes from the mold.

As my invention is equally applicable to molding the mantle from the pliable mass or from the liquid, I hereinafter describe how it is performed in each case.

To mold a mantle from a pliable mass, I take a solution of celluloid, preferably concentrated, and thoroughly mix and incorporate therewith a solution or solutions of the salts or oxids of thorium and cerium or other suitable incandescing earths. The mixture is then evaporated until a pliable mass of celluloid is obtained, with which the salts of the earths are thoroughly incorporated. This mass is then molded by pressure into the shape of the desired element, which is preferably that of a hollow cone perforated with a great number of openings, so that the cone has the appearance of a grill or basket. By applying sufficient pressure and with the application of heat during the molding the celluloid can be molded into mantles exhibiting all the network of the ordinary Welsbach mantles. After the mantles are thus molded they are subjected to the action of a denitrating agent, such as ammonium sulfid. These mantles are then ready for use and can be shipped to the consumer, who can put them on a burner and burn them out without requiring any particular skill, or the mantles may be burned out at the factory and hardened by being subjected to the flame of a pressure-burner—*i. e.*, a Bunsen burner—which is supplied with gas under a considerable pressure, as is now commonly used in burning out mantles, or in any other usual manner before they are shipped. The burning out consumes the celluloid, leaving a skeleton of earthy oxids.

To mold a mantle from the liquid, the liquid mixture of celluloid and incandescing earths, produced as hereinbefore described, is not evaporated to a pliable mass, but is injected under pressure into a mold having the desired configuration. As the liquid hardens in the mold it acquires the desired shape, which is preferably a network cone resembling the said Welsbach mantle. This cone (or mantle) is now ready to be shipped to the consumer and burned out by him, or it may be burned out at the factory and hardened, as before described.

I am aware that a mixture of solutions of collodion and incandescible materials has been used for making threads from which to weave mantles, and I do not broadly claim such mixture; but I do claim the following as my invention:

1. The process of making incandescing elements consisting in mixing incandescing mineral matter in solution with celluloid solution, molding the mixture to the shape of the incandescing element and denitrating it, substantially as described.

2. The process of making incandescing elements consisting in mixing incandescing mineral matter in solution with celluloid solution, molding the mixture to the desired shape under the influence of pressure and heat and denitrating the product, substantially as described.

3. The process of making incandescing elements consisting in mixing incandescent mineral matter in solution with celluloid solution, evaporating the mixture to a pliable mass, molding this mass to the desired shape and denitrating the product, substantially as described.

CHARLES G. RICHARDSON.

In presence of—
DAVID WALTER BROWN,
HENRY P. BROWN.